Figure 1:
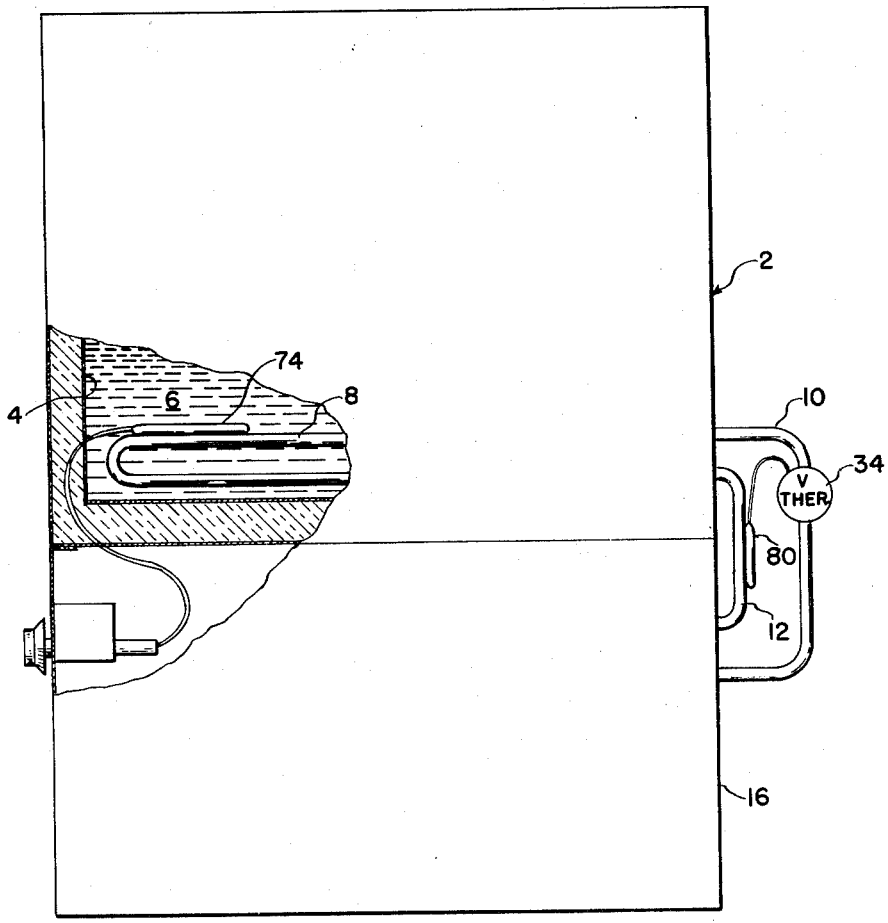

Aug. 9, 1960 J. A. LAWLER 2,948,125
SCIENTIFIC APPLIANCE TEMPERATURE CONTROL ARRANGEMENT
Filed Dec. 10, 1956 2 Sheets-Sheet 1

Inventor
Joseph A. Lawler

Inventor
Joseph A. Lawler

United States Patent Office 2,948,125
Patented Aug. 9, 1960

2,948,125

SCIENTIFIC APPLIANCE TEMPERATURE CONTROL ARRANGEMENT

Joseph A. Lawler, Chicago Heights, Ill., assignor to Blue M Electric Company, Blue Island, Ill., a corporation of Illinois Filed Dec. 10, 1956, Ser. No. 627,399

6 Claims. (Cl. 62—199)

The invention relates to an arrangement which offers extremely accurate lower range temperature control required in scientific apparatus, such as, for example, liquid specimen baths.

As is well known to those familiar with the art, modern technology is increasingly demanding accurate and fine temperature control, particularly in scientific devices. In addition to the demand for accurate control, modern users give close attention to overall apparatus economy, particularly as indicated by such factors as trouble free operation and length of operating life. Prior art arrangements utilized in the scientific field have demonstrated certain disadvantages, among them being an inability to provide both desired temperature control as well as long continued satisfactory operation. For example, in lower range temperature liquid baths, where cooling units have been employed, the use of highly sensitive thermostatic controls in an effort to maintain close temperature tolerances has resulted in overload stopping the cooling unit because of frequent on-off cycling of the arrangement per unit of time. This fact in addition to the difficulty of many prior art arrangements of an inability to promptly initiate operation against a high pressure load seriously jeopardizes normal scientific test procedures. Further, the rapid cycling results in deterioration of cooling unit compressor and thermostatic control life. A practical effect of these and other difficulties is that close tolerance temperature control has not been maintained as desired and the economy and efficiency of many scientific operations have been impaired.

Accordingly, it is a general object of the invention to provide an arrangement of the type described for use in scientific appliances that will offer fine tolerance temperature control.

It further is a general object of the invention to provide an arrangement of the type described that will eliminate difficulties heretofore found in the art.

It is also a specific object of the invention to provide a versatile arrangement that will efficiently accomplish fine tolerance temperature control over a wide range of load conditions.

The invention generally comprehends a scientific appliance wherein accurate lower range temperature control is important, having operatively associated therewith a cooling mechanism comprising a primary loading coil, a secondary loading coil, a refrigerating device including a compressor and heat dissipating elements, a closed circuit conduit arrangement, a valve control operative to selectively divert flow to the primary or secondary coils in response to temperature level in the appliance, and valve means to meter refrigerant flow to the primary coil in response to load thereon.

Figure 2:
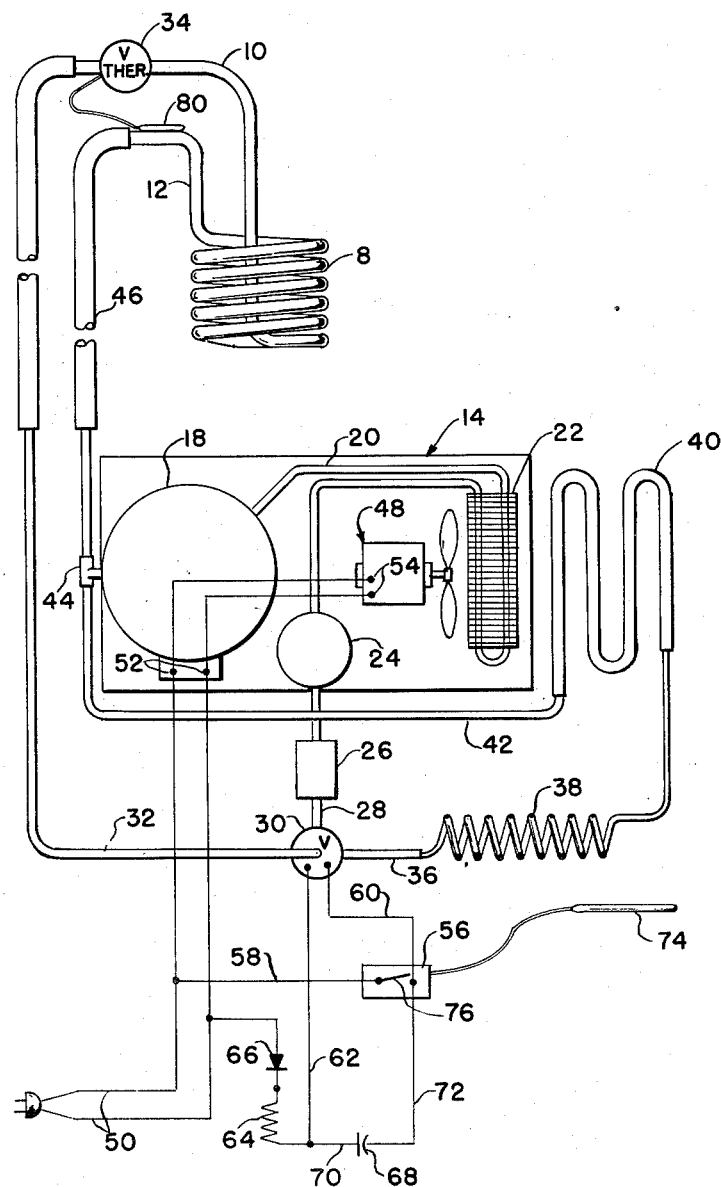

These and other objects of the invention will become apparent in the course of the following description and from an examination of the concerned drawings, wherein:

Figure 1 is an elevational view of a scientific appliance embodying the invention, and Figure 2 is a schematic view of the operating device employed in Figure 1.

Describing the invention in detail and directing attention first to Figure 1, it will be seen that the invention is illustrated as applied to a liquid bath arrangement indicated generally at 2. It will be understood by those familiar with the scientific field that liquid baths comprise a liquid container compartment 4 arranged to receive, in any conventional manner, specimens of varying types wherein it is desired to maintain said specimens at a determined temperature level for specified periods of time. In many applications the temperature level is in the lower range, that is, below ambient temperature. In this circumstance, means to cool the liquid 6 in the bath must be provided. The invention may also be adapted to other scientific appliances wherein lower range temperature control as herein defined is required.

In the bath arrangement shown, a primary cooling coil 8 is preferably located in the lower portions of the compartment 4 to provide for cooling of the liquid 6. A refrigerant delivery conduit 10 communicates with one end of the coil 8 and a return conduit 12 communicates with the other end of the primary coil 8. The conduits 10 and 12 are operatively associated with a refrigerating mechanism indicated generally at 14 in Figure 2 and which may be located in the base 16 or the bath arrangement 2. For purposes of clarity, the arrangement is not shown in Figure 1, but is schematically illustrated in Figure 2.

Directing attention to Figure 2, it will be seen that the mechanism 14 comprises a conventional compressor 18. A conduit 20 communicates with the output side of the compressor 18 and is further arranged to carry the refrigerating product through the condenser 22 and to a receiver 24. As is well known to those skilled in the art, the refrigerant under the action of the compressor etc., is compressed and condensed to liquid form. The liquid refrigerant is carried from the receiver 24 through a filter 26 and via line 28 to a directional flow solenoid valve 30. A line 32 communicates with one side of the directional flow valve 30 to carry refrigerant to a thermostatic expansion valve 34 which in turn communicates with the delivery conduit 10 communicating with coil 8. Another side of the directional flow valve 30 communicates with line 36 which in turn communicates with a capillary tube 38 connected to the feed side of a secondary or auxiliary coil 40. The return side of the secondary coil 40 communicates with a line 42 which in turn communicates with an intake port 44 of the compressor 18. Return line 12 of the primary coil 8 communicates with a line 46 which also establishes communication with the intake port 44 of the compressor 18. A motor operated fan arrangement 48 is preferably positioned immediately adjacent the condenser 22 to draw ambient air therethrough and over the secondary coil 40. It will be noted that the secondary coil 40 can be located on either side of the condenser 22.

Considering the electrical control shown in Figure 2, it will be seen that a power source 50, preferably a standard 110 volt A.C. line, is provided. The power source is directly connected to the compressor at 52 and to the fan arrangement at 54 whereby upon connection to the power source the compressor 18 and the fan arrangement 48 are immediately energized and begin operating. An automatic control arrangement 56 is directly connected to the power source via line 58. The other side of the arrangement 56 is connected via line 60 to one side of the solenoid operated valve 30. The other side of the solenoid operated valve 30 is preferably connected to the power source, via line 62 and may be in series with a resistance 64 and rectifier 66. An electrical condenser 68 is connected in parallel across the solenoid operated valve 30 via lines 70 and 72.

Thus in this embodiment a D.C. voltage with the condenser 68 to substantially smooth out variations therein is provided to actuate the valve 30. However, it will be understood that except as hereinafter explained, some embodiments may employ an A.C. operated valve 30 and thus eliminate the need for rectification and the like here provided.

The control arrangement 56 is provided with a thermostatic sensing arrangement 74 (Figures 1 and 2), it being understood that the arrangement 56 comprises a closable switch 76 which is operatively responsive to a sensed temperature change received via the sensing element 74. That is, the control 56 may be set at a desired temperature level or control point and any departure from that control point of the liquid in the bath 2 will result in closure of the switch 76. It will be noted also that the valve 34 is a thermostatically operated valve and is provided with a temperature sensing bulb 80 which is arranged in close juxtaposition to the return line 12 of the primary coil 8. The operation of the valve 34 as well as the control 56 will hereinafter be explained in detail.

Considering the operation of the arrangement it will be remembered that upon connection to the power source 50 the compressor 18 and fan arrangement 48 immediately begin operating. The compressor 18 delivers liquified refrigerant to the solenoid operated valve 30 which is normally arranged to divert said refrigerant into line 36 and through the secondary coil 40, it being understood that the secondary coil 40 offers a substantially constant load by reason of being bathed in ambient air. If the temperature of the liquid 6 in the bath is substantially above the set or control point, this information will be transmitted by the sensing element 74 to the control 56 which induces closure of the switch 76 establishing a direct current circuit through the solenoid valve 30. Upon establishing of this circuit, the solenoid valve 30 diverts liquified refrigerant to thermostatic valve 34 via conduit 32 and from thence to the primary coil 8. The thermostatic expansion valve 34, being of the variable type, delivers variable quantities of refrigerant to the evaporating primary coil 8 depending upon the sensed load thereon transmitted to the valve from the sensing bulb 80. In short, if the bath is substantially off the control point, a large volume of refrigerant will be delivered to the primary coil 8 to induce rapid cooling thereof or if the temperature divergence is relatively small, a proportionately lower volume of refrigerant will be delivered to the coil 8.

Upon return of the bath to the set or control point, the control 56 being responsive to temperature level therein, induces opening of switch 76 and resulting de-energizing of directional flow solenoid valve 30 and refrigerant flow is again directed to the secondary coil 40. The above cycle, of course, will be repeated as departure of the bath from control temperature requires.

Under some circumstances it may be desirable to provide a "dampening" of the action of the directional flow solenoid valve 30. This may occur, for example, where an extremely sensitive thermostatic control arrangement is employed. In this circumstance the condenser 68 is selected for inclusion in the circuit so that it will provide current flow to the valve 30 for a time interval after opening of switch 76. This variation of the disclosed arrangement may operate as follows:

During closure of switch 76 the condenser 68 is charged. As the control point or set temperature is reached the element 74, sensing the change in the bath arrangement, induces opening of switch 76. At this point, the condenser 68 discharges across the solenoid valve 30 and maintains same energized thus continuing the flow of refrigerant to the primary coil 8 for a short interval of time. Upon discharge of the condenser 68 the solenoid valve 30 is de-energized and refrigerant flow is again diverted to the secondary coil 40. Thereafter, upon the departure of the bath liquid 6 from the control or set temperature, the switch 76 is again closed and refrigerant diverted to the primary coil 8 in a manner as above described. This "dampening" action thus avoids unsatisfactory operation such as solenoid chatter and the like.

In operation of the arrangement it has been found that the temperature in the scientific appliance can be controlled within extremely close tolerances, that is, to approximately plus or minus fifteen hundredths of a degree centigrade. In addition to this fine control, it has been found that the arrangement affords both efficient and economical operation due to effective lengthening of compressor and thermostatic control life. For example, continuous compressor operation in combination with selective diverting of refrigerant flow avoids the operating deterioration and overloading heretofore mentioned. A further practical result is the elimination of the necessity for close supervision of the device without jeopardizing scientific processes and tests. Further, the proportioning of refrigerant flow to the primary cooling coil in relation to demand has added a highly desirable versatility to the arrangement in that it is efficiently susceptible of use in a wide range of loading conditions without impairing accuracy of control.

The invention as disclosed is by way of illustration and not limitation and may be subject to various modifications without departing from the spirit thereof or the scope of the appended claims.

What is claimed is:

1. In a scientific appliance for close tolerance lower range temperature control, a control temperature chamber, a primary evaporating coil in said chamber, a secondary evaporating coil outside said chamber, a refrigerant compressor having an intake port and an output port, a condenser operatively connected to the output port, a fan adjacent the condenser and arranged to bathe the latter in ambient air, a two-way valve arranged to receive refrigerant from the condenser, a first line from the valve to the intake side of the primary coil, a second line from the valve to the intake side of the secondary coil, a first expansion device in said first line before said intake side of said primary coil, a second expansion device in said second line before said intake side of said secondary coil, said first expansion device being operative to variably admit refrigerant to the primary coil in response to load on said primary coil, conduit means manifold to said intake port and connected to the outlet side of said primary and secondary coils, and electrically operated control means arranged to induce continuous operation of said compressor and fan and continuous refrigerant circulation, said control means including means to selectively operate said two-way valve to alternately direct refrigerant to the primary and secondary coils in response to the temperature condition in said chamber, said last mentioned means including a sensing bulb in said chamber, a switch connected to the bulb and operable in response to bulb action to change the direction of refrigerant flow through said two-way valve.

2. The scientific appliance according to claim 1, wherein said second expansion device comprises a capillary tube operative to admit a constant volume of refrigerant to said secondary coil.

3. A scientific appliance according to claim 2, wherein said first expansion device is a thermostatically operated valve, and including a sensing arrangement associated with the return side of said primary coil and operative to control the volume of refrigerant admitted to said primary coil by said thermostatic valve.

4. A scientific appliance according to claim 3, wherein said two-way valve is a solenoid operated valve and said switch is arranged to control an electric circuit to said solenoid valve.

5. A scientific appliance according to claim 4, and including electrical means associated with said circuit and said solenoid valve and operative to temporarily delay solenoid valve action and thereby temporarily delay diverting of said refrigerant from said primary coil to said secondary coil.

6. A scientific appliance according to claim 5, wherein said secondary coil is in close juxtaposition with said condenser and fan whereby the secondary coil is bathed in ambient air.

References Cited in the file of this patent

UNITED STATES PATENTS

| | | |
|---|---|---|
| 1,523,112 | FitzGerald | Jan. 13, 1925 |
| 1,921,178 | Wood | Aug. 8, 1933 |
| 2,462,240 | Van Vliet | Feb. 22, 1949 |